United States Patent
Calinov et al.

(10) Patent No.: US 7,334,013 B1
(45) Date of Patent: Feb. 19, 2008

(54) SHARED SERVICES MANAGEMENT (75) Inventors: Iulian D. Calinov, Redmond, WA (US); Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 10/324,959

(22) Filed: Dec. 20, 2002

(51) Int. Cl.
*G06F 15/16* (2006.01)
(52) U.S. Cl. ........................ 709/201; 709/218; 709/223
(58) Field of Classification Search ................ 709/201, 709/218, 223, 224, 226, 227, 229, 230, 243
See application file for complete search history.

(56) References Cited

U.S. PATENT DOCUMENTS

| | | |
|---|---|---|
| 5,163,147 A | 11/1992 | Orita |
| 5,414,852 A | 5/1995 | Kramer et al. |
| 5,544,322 A | 8/1996 | Cheng et al. |
| 5,682,478 A | 10/1997 | Watson et al. |
| 5,708,780 A | 1/1998 | Levergood et al. |
| 5,812,784 A | 9/1998 | Watson et al. |
| 5,875,296 A | 2/1999 | Shi et al. |
| 5,918,228 A | 6/1999 | Rich et al. |
| 5,987,232 A | 11/1999 | Tabuki |
| 5,995,972 A | 11/1999 | Allgeier |
| 6,064,666 A * | 5/2000 | Willner et al. ............. 370/352 |
| 6,065,120 A * | 5/2000 | Laursen et al. ............. 726/5 |
| 6,070,243 A * | 5/2000 | See et al. .................. 726/2 |
| 6,226,752 B1 | 5/2001 | Gupta et al. |
| 6,243,816 B1 | 6/2001 | Fang et al. |
| 6,253,203 B1 | 6/2001 | O'Flaherty et al. |
| 6,269,369 B1 | 7/2001 | Robertson |
| 6,275,824 B1 | 8/2001 | O'Flaherty et al. |
| 6,275,944 B1 | 8/2001 | Kao et al. |
| 6,314,425 B1 | 11/2001 | Serbinis et al. |
| 6,374,359 B1 | 4/2002 | Shrader et al. |
| 6,381,579 B1 * | 4/2002 | Gervais et al. ............. 705/8 |
| 6,438,600 B1 | 8/2002 | Greenfield et al. |
| 6,463,533 B1 | 10/2002 | Calamera et al. |
| 6,466,932 B1 | 10/2002 | Dennis et al. |
| 6,480,850 B1 | 11/2002 | Veldhuisen |
| 6,482,752 B1 | 11/2002 | Yamazaki et al. |

(Continued)

OTHER PUBLICATIONS

Grover et al., "E-Commerce and the Information Market," Communications of the ACM, Apr. 2001, vol. 44, Issue 4, ACM Press, New York, U.S.A.

(Continued)

*Primary Examiner*—Bunjob Jaroenchonwanit
*Assistant Examiner*—Van Kim T Nguyen
(74) *Attorney, Agent, or Firm*—Senniger Powers (57) ABSTRACT

Methods and system of sharing information among network servers coupled to a data communication network for providing services to a user via a client on the network and data structure for use therewith. Related services provided by the network servers are grouped into service groups. A database stores user-specific information, including operational information to be shared within the service groups. A central server coupled to the network receives a request from the user for a selected service and determines whether the selected service belongs to one of the service groups. In response to the request, the central server retrieves user-specific information identifying the user with respect to the selected service. The retrieved information includes operational information to be shared within each of the service groups to which the selected service belongs.

36 Claims, 5 Drawing Sheets

U.S. PATENT DOCUMENTS

| | | | |
|---|---|---|---|
| 6,631,361 B1 | 10/2003 | O'Flaherty et al. | |
| 6,678,828 B1 | 1/2004 | Pham et al. | |
| 6,763,468 B2 | 7/2004 | Gupta et al. | |
| 6,820,201 B1 * | 11/2004 | Lincoln et al. | 713/179 |
| 6,820,204 B1 | 11/2004 | Desai et al. | |
| 6,851,060 B1 | 2/2005 | Shrader | |
| 6,871,279 B2 * | 3/2005 | Sames et al. | 713/185 |
| 6,888,828 B1 * | 5/2005 | Partanen et al. | 370/389 |
| 6,904,417 B2 | 6/2005 | Clayton et al. | |
| 6,941,475 B1 * | 9/2005 | Assetto et al. | 713/150 |
| 6,954,799 B2 | 10/2005 | Lerner | |
| 6,959,336 B2 | 10/2005 | Moreh et al. | |
| 6,981,043 B2 | 12/2005 | Botz et al. | |
| 6,985,955 B2 * | 1/2006 | Gullotta et al. | 709/229 |
| 7,007,092 B2 * | 2/2006 | Peiffer | 709/227 |
| 7,036,142 B1 * | 4/2006 | Zhang et al. | 726/12 |
| 7,051,094 B1 * | 5/2006 | Sahai et al. | 709/223 |
| 7,073,195 B2 * | 7/2006 | Brickell et al. | 726/5 |
| 7,155,739 B2 | 12/2006 | Bari et al. | |
| 7,188,181 B1 | 3/2007 | Squier et al. | |
| 2001/0023421 A1 | 9/2001 | Numao et al. | |
| 2001/0042126 A1 | 11/2001 | Wong et al. | |
| 2001/0049620 A1 | 12/2001 | Blasko | |
| 2002/0019828 A1 | 2/2002 | Mortl | |
| 2002/0023059 A1 | 2/2002 | Bari et al. | |
| 2002/0026345 A1 | 2/2002 | Juels | |
| 2002/0049907 A1 | 4/2002 | Woods et al. | |
| 2002/0091639 A1 * | 7/2002 | Mandahl et al. | 705/50 |
| 2002/0095571 A1 | 7/2002 | Bradee | |
| 2002/0099671 A1 | 7/2002 | Mastin Crosbie et al. | |
| 2002/0104015 A1 | 8/2002 | Barzilai et al. | |
| 2002/0112171 A1 | 8/2002 | Ginter et al. | |
| 2002/0147929 A1 | 10/2002 | Rose | |
| 2002/0188572 A1 | 12/2002 | Bleizeffer et al. | |
| 2002/0194501 A1 | 12/2002 | Wenocur et al. | |
| 2003/0023451 A1 | 1/2003 | Willner et al. | |
| 2003/0046576 A1 | 3/2003 | High, Jr. et al. | |
| 2003/0081791 A1 | 5/2003 | Erickson et al. | |
| 2003/0084172 A1 * | 5/2003 | deJong et al. | 709/229 |
| 2003/0088520 A1 | 5/2003 | Bohrer et al. | |
| 2003/0097451 A1 | 5/2003 | Bjorksten et al. | |
| 2003/0191703 A1 | 10/2003 | Chen et al. | |
| 2003/0196094 A1 | 10/2003 | Hillis et al. | |
| 2004/0044628 A1 | 3/2004 | Matthew et al. | |
| 2004/0054918 A1 | 3/2004 | Duri et al. | |
| 2004/0054919 A1 | 3/2004 | Duri et al. | |
| 2004/0083243 A1 | 4/2004 | Feng et al. | |
| 2004/0088579 A1 | 5/2004 | Powers et al. | |
| 2005/0076233 A1 | 4/2005 | Aarts et al. | |
| 2005/0216771 A1 | 9/2005 | Malcolm | |
| 2005/0240622 A1 | 10/2005 | Cheung | |

OTHER PUBLICATIONS

NEWTON, "Newton's Telecom Dictionary," 19th Edition, CMP Books, Mar. 2003, 3 pages, U.S.A.

Author Unknown, "MSN Hotmail Information: Problems signing in?", Obtained via the Internet Archive at http://web.archive.org/web/20001018140004/lc4.law5.hotmail.passport.com/cgi-bin/dasp/hminfo_shell.asp?_lang=&content=problems, printed Mar. 16, 2007, 2 pages, © 2000 Microsoft Inc., USA.

* cited by examiner

| SITE | SERVICE GROUP | ACTIVE CONTEXT |
|---|---|---|
| A | 1 | 1 |
| B | 1 | 1 |
| C | 2 | 1 |
| D | 2 | 1 |
| A | 3 | 2 |
| C | 3 | 2 |

FIG. 5

SHARED SERVICES MANAGEMENT

TECHNICAL FIELD

The present invention relates to the field of computer network environments. In particular, this invention relates to scalable, cookie-less sharing of information among related sites that are affiliated with a multi-site user authentication system.

BACKGROUND OF THE INVENTION

Web sites, or Internet sites, very often provide information, products, services, and the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Using a presently available multi-site user authentication system (e.g., Microsoft®.NET™ Passport single sign-in service), a web user can maintain a single login ID (and associated password) for accessing multiple, affiliated web servers or services. Such a system permits the user to establish a unique account identified by, for example, an e-mail address.

Large Internet service providers often have many different web sites through which they offer services to consumers. Related sites may, but are not required to, have the same use policies, privacy policies, and/or ownership. Moreover, consumers frequently perceive them as being essentially the same service. Further, as Internet usage migrates to a subscription-based model that includes content and services from a variety of different sites, the need exists for accurately sharing common information (e.g., billing and subscription information) between related sites. Unfortunately, efficiently sharing service-specific consumer information (e.g., the fact that the consumer is a premium subscriber) between the affiliated sites is difficult. Many conventional approaches are cookie-based, which creates a number of shortcomings. For example, cookie-based systems do not scale well because cookies are inherently limited in size. Moreover, cookie-based systems present a privacy issues because data shared using a cookie-based domain separation technique lacks the granularity to reflect the differences in privacy policies among the related sites. Another conventional approach for sharing information between sites involves making server-to-server calls. Such techniques are expensive in terms of resources as they assume not only high availability of all sites but also direct connections.

For these reasons, a reliable solution for sharing information among groups of related sites is needed.

SUMMARY OF THE INVENTION

The invention meets the above needs and overcomes one or more deficiencies in the prior art by providing improved sharing of information among related sites. In particular, the present invention efficiently shares service-specific consumer information between related affiliate sites. The invention operates reliably to provide real-time roaming state management without expensive server-to-server calls or limited client-based technologies such as cookies. Moreover, the features of the present invention described herein are less laborious and easier to implement than currently available techniques as well as being economically feasible and commercially practical.

Briefly described, a method embodying aspects of the invention improves sharing information among network servers. The network servers are coupled to a data communication network for providing services to a user via a client, which is also coupled to the data communication network. The method includes grouping a plurality of the services provided by the network servers to define one or more service groups and storing, in a central database, user-specific information identifying the user with respect to at least one of the services. In this instance, the user-specific information includes operational information to be shared within the service groups. The central database is associated with a central server coupled to the data communication network. The method also includes receiving, at the central server, a request from the user for a first selected service to be provided by one of the network servers and determining whether the first selected service belongs to one of the service groups. In response to the request, the user-specific information identifying the user with respect to the first selected service is retrieved from the central database. The retrieved user-specific information includes operational information to be shared within each of the service groups to which the first selected service belongs.

In another embodiment, the invention is directed to a method of sharing information among affiliate servers coupled to a data communication network in a multi-site authentication system. The authentication system includes an authentication server that is coupled to the data communication network and a database associated with the authentication server. The database stores authentication information for comparison to login information provided by a user for authenticating the user. The system includes storing, in the database, user-specific information that identifies the user with respect to one or more services provided by the affiliate servers. The user-specific information includes operational information to be shared within pre-defined groups of the affiliate servers. The affiliate servers provide the services to the user via a client computer coupled to the data communication network. The method includes receiving, at the authentication server, a request from the user for a first selected service to be provided by one of the affiliate servers. In response to authenticating the user, the authentication server generates an authentication ticket associated with the user and the first selected service. Operational information to be shared within each of the groups to which the first selected service belongs is associated with the authentication ticket. The method further includes routing the user, with the ticket, to the affiliate server that provides the first selected service.

In yet another embodiment, a data structure according to the invention has a first field containing user profile information identifying a user of a client with respect to one or more services provided by a plurality of network servers. The client and the network servers are coupled to a data communication network. A second field contains operational information specific to a selected service to be provided by one of the network servers and a third field contains operational information for sharing between the selected service and at least one other service grouped with the selected service in a pre-defined service group. In this instance, a central server coupled to the data communication network routes the user to the network server providing the selected service with the data structure for sharing information within the pre-defined service group.

An authentication system embodying aspects of the invention includes an authentication server coupled to a data communication network. The system also includes an authentication database associated with the authentication server. The authentication database stores authentication information for comparison to login information that is provided by a user for authenticating the user. The authentication database also stores user-specific information identifying the user with respect to one or more services provided by affiliate servers, which are also coupled to the data communication network. The user-specific information includes operational information that is to be shared within pre-defined groups of the affiliate servers. The affiliate servers provide the services to the user via a client coupled to the data communication network. According to the invention, the authentication server is configured to receive a request from the user for a first selected service to be provided by one of the affiliate servers. In response to the request, the authentication server authenticates the user when login information retrieved from the user via the data communication network matches the authentication information stored in the authentication database. The authentication server generates an authentication ticket associated with the user and the first selected service in response to authenticating the user. The authentication ticket has operational information associated with it to be shared within each of the groups to which the first selected service belongs. The authentication server is also configured to route the user, with the ticket, to the affiliate server that provides the first selected service for sharing the operational information.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
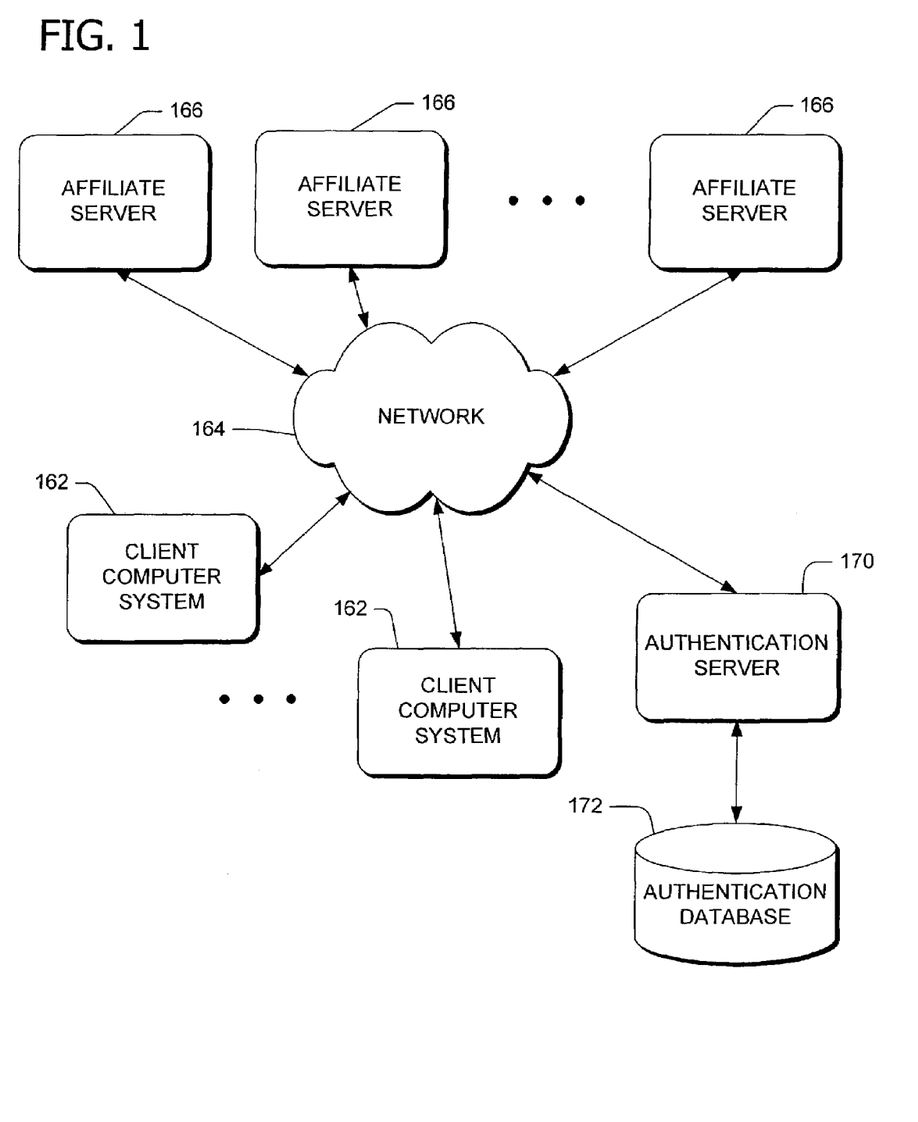
FIG. 1 is a block diagram illustrating an exemplary network environment in which the present invention is utilized.

Referring now to the drawings, FIG. 1 illustrates an exemplary network environment in which the present invention is utilized for providing real-time roaming state management. In particular, the present invention involves efficiently sharing operational information among related sites. The invention further relates to cross-internet collaboration between web sites as part of a distributed, multi-site user authentication system (e.g., Microsoft®.NET™ Passport sign on service). Such services provide a user with the ability to access one or more participating Web sites or resources with a single sign-in. Although the participating sites (referred to as "affiliates" or "affiliate sites") maintain control over permissions, they use the authentication service rather than hosting and maintaining their own proprietary authentication systems. The related sites or services are referred to herein as a service group or shared services group because they represent a group of independent sites IDs that together provide a user with a set of services. As an example, ESPN® sports network is a premium service content provider with an MSN® Internet services subscription.

One of several administrative groups, a service group consists of site IDs that work together to provide the user with a consistent set of services. Members of a service group need not share the same privacy statement. When this is the case, the user typically consents to the sharing of data. There should be a contractual arrangement providing the user with a known set of services. One such situation is when a network of Internet services provides premium content through affiliated sites (e.g., Walt Disney Company and ESPN, Inc. currently provide premium content sites on the MSN® network of Internet services). Operational information that may be maintained by one site (e.g., MSN.com) but accessible to both the one site and another related site (e.g., MSN.com and Disney.com), indicates that the user has MSN® Internet services, for example, premium content. This information allows the user to move between content providers without having to re-authenticate or prove membership as a premium content subscriber. Further, multicompany corporations can be represented as a service group when they do not share a corporate privacy statement. This might be when a financial company owns both banks and insurance companies and it wants the user to be able to move between the different companies without having to re-authenticate or prove membership.

In FIG. 1, one or more client computer systems 162 are coupled to a data communication network 164. In this example, the network 164 is the Internet (or the World Wide Web). However, the teachings of the present invention can be applied to any data communication network. Multiple affiliate servers 166 are also coupled to network 164. In turn, the client computer systems 162 can access the affiliate servers 166 via network 164. Affiliate servers 166 are also referred to as "web servers" or "network servers."

An authentication server 170 coupled to network 164 allows communication between itself and client computer systems 162 and web servers 166. Although referred to as an "authentication server," authentication server 170 in the illustrated embodiment is also a web server capable of interacting with web browsers and other web servers. In this example, authentication server 170, client computer systems 162, and web servers 166 communicate data among themselves using the hypertext transfer protocol (HTTP), a protocol commonly used on the Internet to exchange information.

An authentication database 172 is coupled to authentication server 170. The authentication database 172 contains information (i.e., credentials) necessary to authenticate a user of one of the client computer systems 162 (as well as other users on the network) and also identifies which elements of the user profile information should be provided to a particular affiliate server 166 when the user accesses the affiliate server. In general, a credential is a means for generating an authenticated reference to a single account identifier. For example, an EASI (E-mail As Sign-In) sign-in name and password, a mobile phone number and PIN, and a biometric signature are all credentials that can be associated with the same profile data.

Although authentication database 172 is shown as a single storage unit separate from authentication server 170, it is to be understood that in other embodiments of the invention, authentication database 172 may be one or more memories contained within or separate from authentication server 170. In a federated environment, for example, a plurality of authentication servers 170 may be used to provide authentication.

As described above, conventional techniques fall short of efficiently sharing service-specific consumer information between grouped affiliate sites 166. In one embodiment, the present invention solves this problem of real-time roaming state management without resorting to either expensive server-to-server approaches or limited client-based technologies such as cookies. Moreover, the present invention effectively addresses consumer privacy issues.

The authentication server 170, as described herein, authenticates a user of client computer 162 seeking access to a particular one of the affiliate servers 166. Authentication server 170 first requests authenticating login information from the user, such as the user's login ID and password. If the user is successfully authenticated, authentication server 170 to route the user's client computer 162 to the appropriate affiliate server 166 for performing a desired service for the user. According to the present invention, authentication server 170 routes the user together with an authentication ticket containing shared information.

As part of the user authentication process, authentication server 170 may provide certain user profile information to affiliate server 166, such as the user's e-mail address, user preferences, and the type of Internet browser installed on client computer 162. This user profile information is associated with the user's login ID so that each time the user logs into a particular affiliate server 166, the associated user profile information is available to the affiliate server. This user profile allows the user to enter the information once and use that information during subsequent logins to new affiliate servers. By maintaining user profile information, the authentication system of the invention is able to share pertinent information with the affiliate sites to speed registration and enable access to personalized accounts or services.

The user profile contains information used to represent participating site/user-specific information (e.g., whether or not the user has premium services such as those provided through MSN® or another Internet portal and online service). One method for enabling participating sites/services to share information about their users with all members of the site/service group is for the authentication system to include these information "bits" in a profile cookie. For instance, a premium content bit for an Internet services network allows all sites on the services network to know that the user has a paid subscription, without having to make additional server-to-server calls. This information may be built into the profile cookie regardless of the site at which the user signs in and is independent of any consent settings. Unfortunately, the use of cookies undesirably exposes user-specific information to participating sites/services that do not have legitimate access ("own") the information and, thus, should not be receiving it. The profile cookie also shares information about a user relationship with another site/service without the consent of the site/service that maintains the relationship.

Advantageously, the present invention includes just the series of tamper proof information (bits) belonging to the site/service to which the user has just signed in. This protects both the user and the site/service. Further, the profile contains operational field information that is never exposed externally, but is used internally by the authentication system (e.g., the system creation date or the terms of use statement last agreed to by the user). According to the invention, the participating site/service only receives those bits belonging to the site/service. The user can view what site-specific bits are stored in his or her profile and view what operational information is stored in his or her profile.

As an example, a consumer navigates from a first site to a related second site using a client application (e.g., a browser). In this example, the first and second sites belong to the same "shared services group." During the transition from the first to second sites, the invention silently routes the user to authentication server 170. At this point, authentication server 170 can attach information, which may be encrypted such that only the first and second sites can decrypt it. The information is specific to the user (e.g., an e-mail address) and specific to the shared services group (e.g., paid-to-date premium content subscriber). Next, the user navigates to a third site, which belongs to a different shared services group than either the first site or second site. During the transition, the user is briefly bounced through the authentication site, namely, authentication server 170. Authentication server 170 attaches a piece of information to the user's client application and sends the user back to the third site. As before, authentication server 170 may encrypt the attached information so that only the third site (and those sites in the same service group as the third site) can decrypt it. The attached information is again specific to the site and specific to the shared services group. In this step however, information that was shared between only the first and second sites, is no longer available to the third site.

APPENDIX A provides additional specific examples.

In this embodiment, any information that is not specific to the current shared services group may be either unencrypted or use a decryption key available to all sites/services subscribing to the multi-site authentication service, or it can even be signed and encrypted using a Public Key Infrastructure (PKI) scheme. Further, the invention allows shared service group members access to their information stored by consumer identity within the authentication database 172, while preventing them access to information belonging to any other shared service group. The user may use a user interface provided by authentication server 170 to view all information related to him or her regardless of the shared services group to which the information pertains. The user may not be able to decrypt the encrypted information that various sites maintain about the user.

In one embodiment, an "affiliate server" is a web server that has "registered" or otherwise established a relationship or affiliation with authentication server 170. Each affiliate server 166 includes a code sequence (not shown) that allows the affiliate server to communicate with authentication server 170 when a user (who is also registered with authentication server 170) requests access to affiliate server 166. Additional details regarding the authentication process and the interaction between client computer 162, affiliate servers 166, and authentication server 170 are provided below.

Prior to executing the authentication process described below, both the user of client computer system 162 and the operator(s) of affiliate servers 166 "register" with authentication server 170. This registration is a one-time process that provides necessary information to the authentication server. The user of client computer system 162 registers with authentication server 170 by providing information about the user and/or client computer system 162, such as, the user's name, mailing address, and e-mail address. As part of the user registration process, the user is assigned (or selects) a login ID, which is a common login ID, used to access any affiliate server (e.g., server 166, 18, 20). The login ID may also be referred to herein as a "username," "member name," or "login name".

Additionally, the user selects a password associated with the login ID that is used for authentication purposes. After registering and logging into authentication server 170, the user can visit any affiliate server 166 (i.e., affiliate servers that are also registered with the same authentication server) without requiring any additional authentication and often without re-entering user information that is already contained in the associated user profile. The present invention sets forth identifying the user account, or profile, by a unique account identifier.

The operator(s) of affiliate servers 166 register with authentication server 170 by providing information about the affiliate server (e.g., server name and Internet address). Additionally, each affiliate server 166 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. After registering with authentication server 170, affiliate servers 166 can use the authentication server to authenticate any user that has also registered with the authentication server.

The authentication server 170 validates the username/password provided by the user. Authentication server 170 handles the authentication response by comparing the login data to the entries in authentication database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that is sent (encrypted) to affiliate site 166 as the authentication credential when the user signs in.

Figure 2:
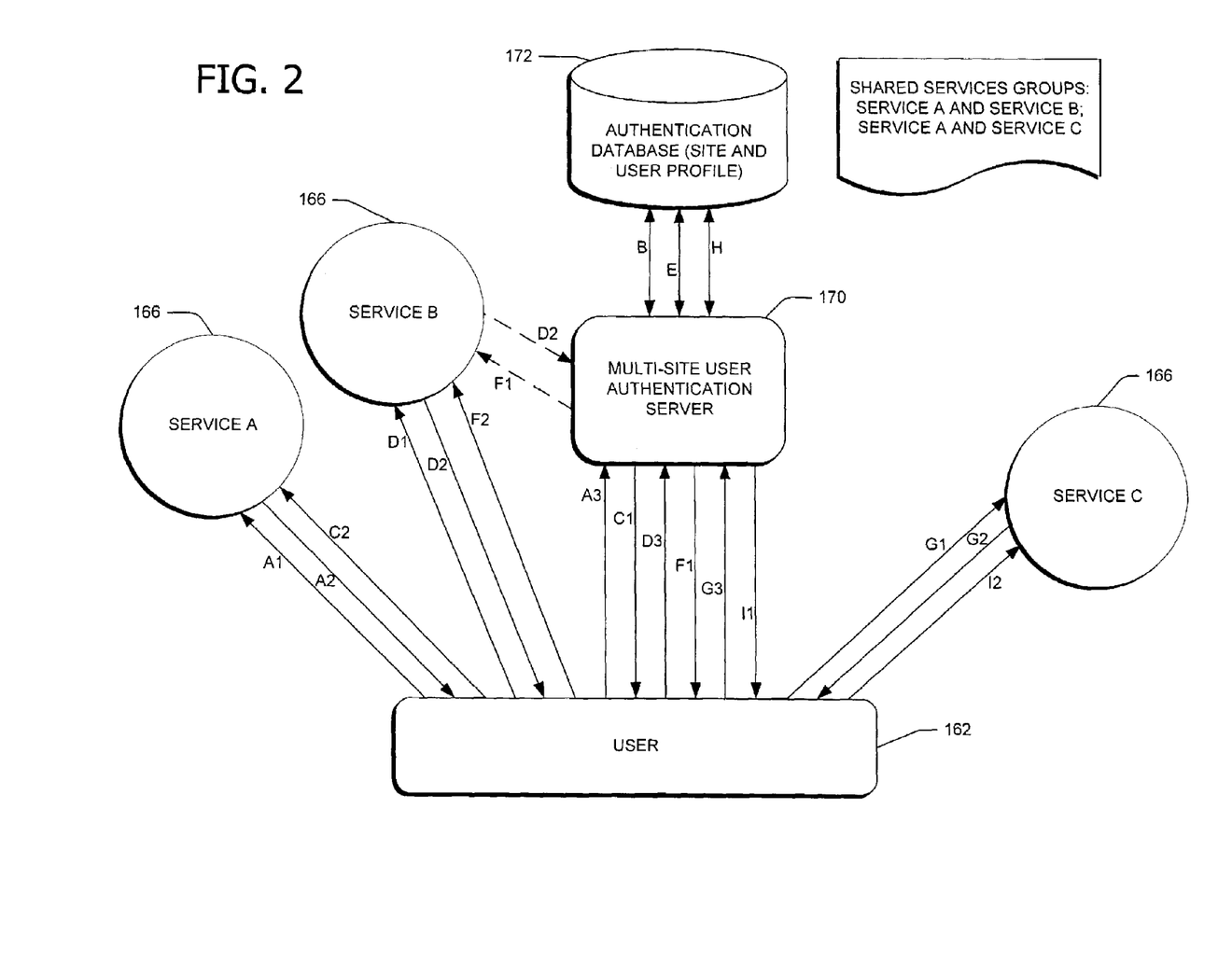
FIG. 2 is a block diagram illustrating an exemplary interaction between client computer, affiliate servers, and authentication server of FIG. 1 for sharing operational information between grouped affiliate servers.

FIG. 2 is an exemplary flow diagram illustrating an implementation of the present invention and the interaction between multiple client computer systems 162, at least one affiliate server 166, and authentication server 170 when users seek to establish accounts with the authentication server. The illustrated example of FIG. 2 describes the situation in which the user of client computer system 162 has not yet logged into affiliate server 166 and has not yet been registered or authenticated by authentication server 170. The lines in FIG. 2 labeled "A" through "I" represent the flow of information or activities during the process. The arrows on the lines indicate the direction of the process flow. In this example, the label "A" represents the beginning of the processes and the label "I" represents the end of the process.

In the exemplary process flow of FIG. 2, Service A and Service B from one shared services group. Service A and Service C form another group. The user, shown at client computer 162, navigates to a first selected service, namely, Service A (see A1). As an example, the user purchases a subscription for premium content from an Internet portal service. Authentication server 170 then initiates sign-in (see A2/A3) and verifies the user's credentials (see B). Further, authentication server 170 creates a ticket containing: (a) user profile information that the user has agreed to share with Service A; (b) operational information specific to Service A; and (c) operational information that is shared between Service A and Service B and operational information that is shared between Service A and Service C (e.g., the user's status as a premium subscriber). The user is signed in to Service A (see C1/C2) with both Service A specific and Service B and Service C shared operational information.

When the user navigates to Service B (see D1), authentication server 170 silently authenticates the user (see D2/D3) inasmuch as the user is navigating within a shared services group. In a similar manner, the authentication server 170 verifies the user (see E) and creates a ticket containing:

(a) user profile information that the user has agreed to share with Service B; (b) operational information specific to Service B; and (c) operational information that is shared between Service A and Service B. Authentication server 170 permits the user to sign in to Service B (see F1/F2) with both Service B specific and Service A shared operational information. However, Service B does not have access to information in the client specific to Service A or shared by Service A and Service C. In this exemplary process flow, the user navigates to Service C (see G1) and is asked to re-authenticate (see G2/G3) because the immediately preceding site was in a different shared services group. Authentication server 170 verifies the user (see H) and creates a ticket containing: (a) user profile information that the user has agreed to share with Service C; (b) operational information specific to Service C; and (c) operational information that is shared between Service A and Service C. The authentication server 170 signs in the user to Service C (see I1/I2) with both Service C specific and Service A shared operational information. As above, Service C does not have access to information specific to Service A or shared by Service A and Service B.

Figure 3:
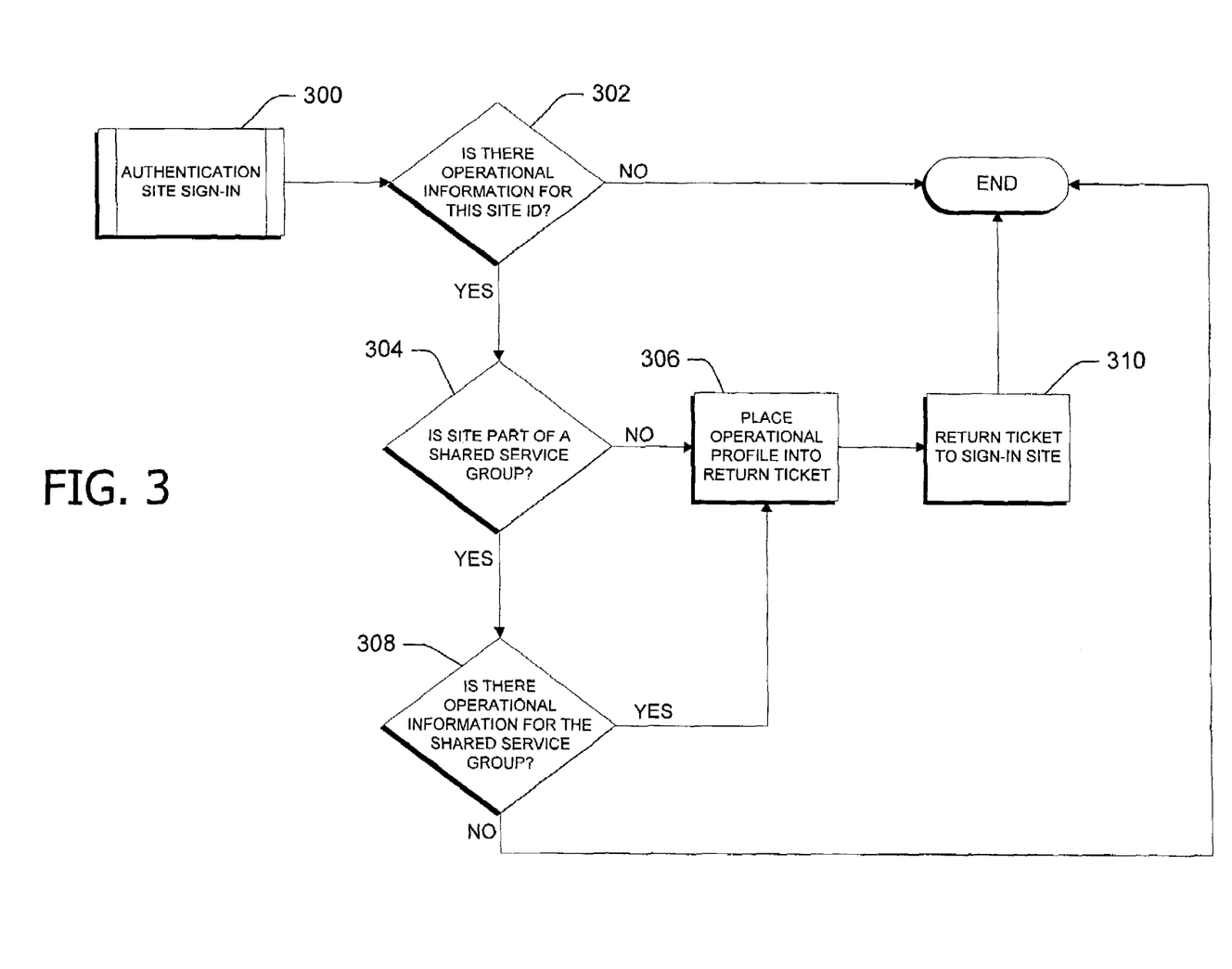
FIG. 3 is an exemplary flow diagram illustrating process flow according to one embodiment of the invention.

Referring now to FIG. 3, an exemplary flow diagram illustrates logical flow for shared service management according to the invention. In FIG. 3, a first service, Service A, has operational information about the user that is specific to Service A; a second service, Service B, has operational information that is shared within its shared services group. In this example, Service B is in a shared service group with Service A; Service C is also in a shared service group with Service A, but is not in the same group as Service B.

Beginning at 300, the user signs in to Service A using an authentication system as described herein. For example, the authentication server 170 authenticates the user of client computer 162 seeking access to a particular one of the affiliate servers 166, namely, the network server providing Service A. Authentication server 170 first requests authenticating login information from the user, such as the user's login ID and password. If the user is successfully authenticated, authentication server 170 checks at 302 for any operational profile information corresponding to Service A. In particular, server 170 searches its associated database 172 for the information. Operations proceed to 304, at which point authentication server 170 determines if Service A is part of a shared service group. As described above, a group of related sites/services may be pre-defined as a shared service group. For example, the grouped services may share a common trait, such as legal owner or the same user context.

As a result of this initial check, authentication server 170 proceeds to 306 if Service A is not part of a shared services group (i.e., single site ID) or to 308 if Service A is part of a shared services group. At 306, only operational information specific to Service A is added to a ticket that is returned to Service A. On the other hand, at 308, authentication server 170 performs a check to determine if there is operational information associated with the group stored in database 172. If so, authentication server 170 places operational information into the authorization ticket at 306 that is both specific to Service A and from the shared services group. Thus, the ticket contains profile and operational information in this example. The authentication server 170 then returns the ticket to the calling site, namely Service A. In other words, authentication server 170 routes the user's client computer 162 along with the ticket to the appropriate affiliate server 166 for performing a desired service for the user.

Although the exemplary flow diagram of FIG. 3 illustrates an end to operations if operational information is not available for either the particular site ID (i.e., Service A) or for the shared service group, it is to be understood that authentication server 170 could simply return user profile information in the authentication ticket.

Figure 4:
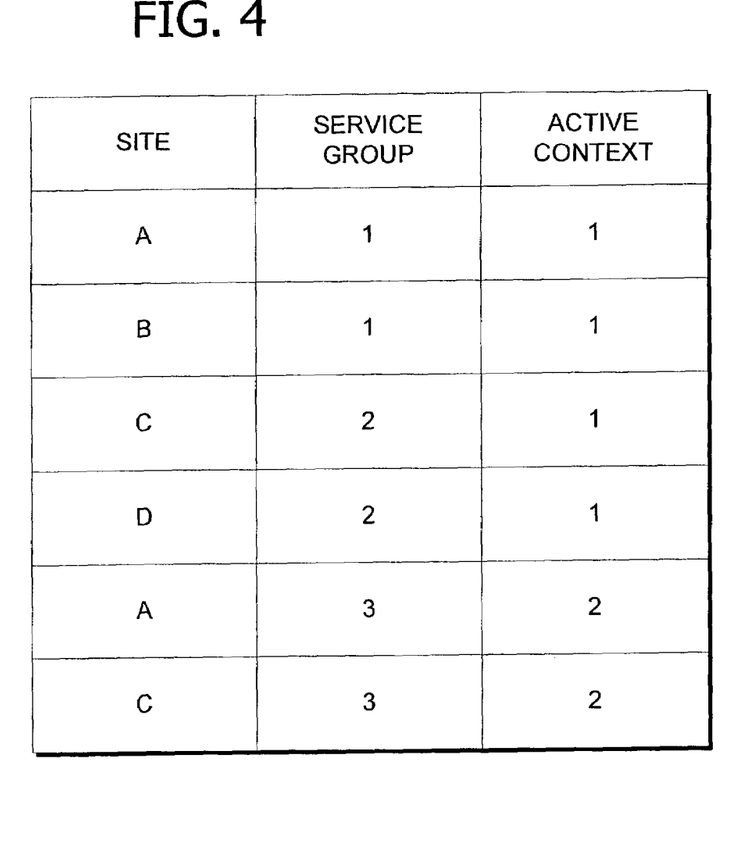
FIG. 4 is a table illustrating information sharing as a function of active context.

FIG. 4 illustrates an alternative embodiment of the invention. In particular, FIG. 4 provides an example of how context affects grouping. For example, a large bank owns an insurance company, a brokerage, and a bank, each of which provides online services. In this instance, each of the sites presents a different context. The user may permit the brokerage to access bank balance information but not the insurance company. Also, a specific site may be a member of multiple, unrelated, shared services groups. The bank may want to offer joint services with the brokerage firm, and totally different and independent joint services with the insurance company. The bank and the consumer will not want the brokerage firm to know about any insurance services the user may have. In such situations the Active Context outlined in FIG. 4 controls what information is sent to the client depending on the user rather than depending on the Service context. For example, when the user visits the brokerage, Active Context 1 is used, and only information specific to the brokerage/bank is sent to the client. When the Active Context is 2, then only information specific to insurance/bank is sent to the client. Finally, when the Active Context is 3, only bank specific information is sent to the client. Note that an active context is specific to the visited sites. An unrelated site, such as a travel site, may have an active context for which the value is 1, but is unrelated to the bank's active context.

Figure 5:
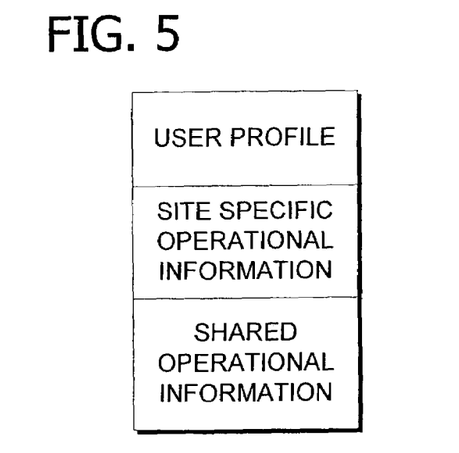
FIG. 5 is a block diagram illustrating an exemplary authentication ticket generated in accordance with the invention.

Referring now to FIG. 5, a data structure according to the invention has a first field containing user profile information identifying the user of client 162 with respect to one or more services provided by network servers 166. A second field contains operational information specific to a selected service to be provided by one of the network servers 166 and a third field contains operational information for sharing between the selected service and at least one other service grouped with the selected service in a pre-defined service group. In one embodiment of the invention, the data structure of FIG. 5 represents the authentication ticket. It is to be understood that the operational information for the shared services travels along with the ticket, but is considered distinct from the ticket in the communication media. In other words, the operational specific information is independent of the ticket, but travels along with the ticket. In an alternative embodiment, the ticket contains the operational information.

In one embodiment of the invention, the multi-site authentication system provides a member services or customer support user experience in which the user has the option of viewing operational information that is stored about him or her and that is shared amongst shared services group members. The user can view the following information found in the site/service bits stored in his or her profile: (a) the name of each site that has specific operational information about the user; (b) under each site, a friendly name describing the information that is stored, though not necessarily the information itself; and (c) a section on shared services that allows the user to discover the members of the shared services group and a friendly name describing the operational information that is stored and shared among the members. According to the invention, the participating site/service only receives those bits belonging to the site/service.

Figure 6:
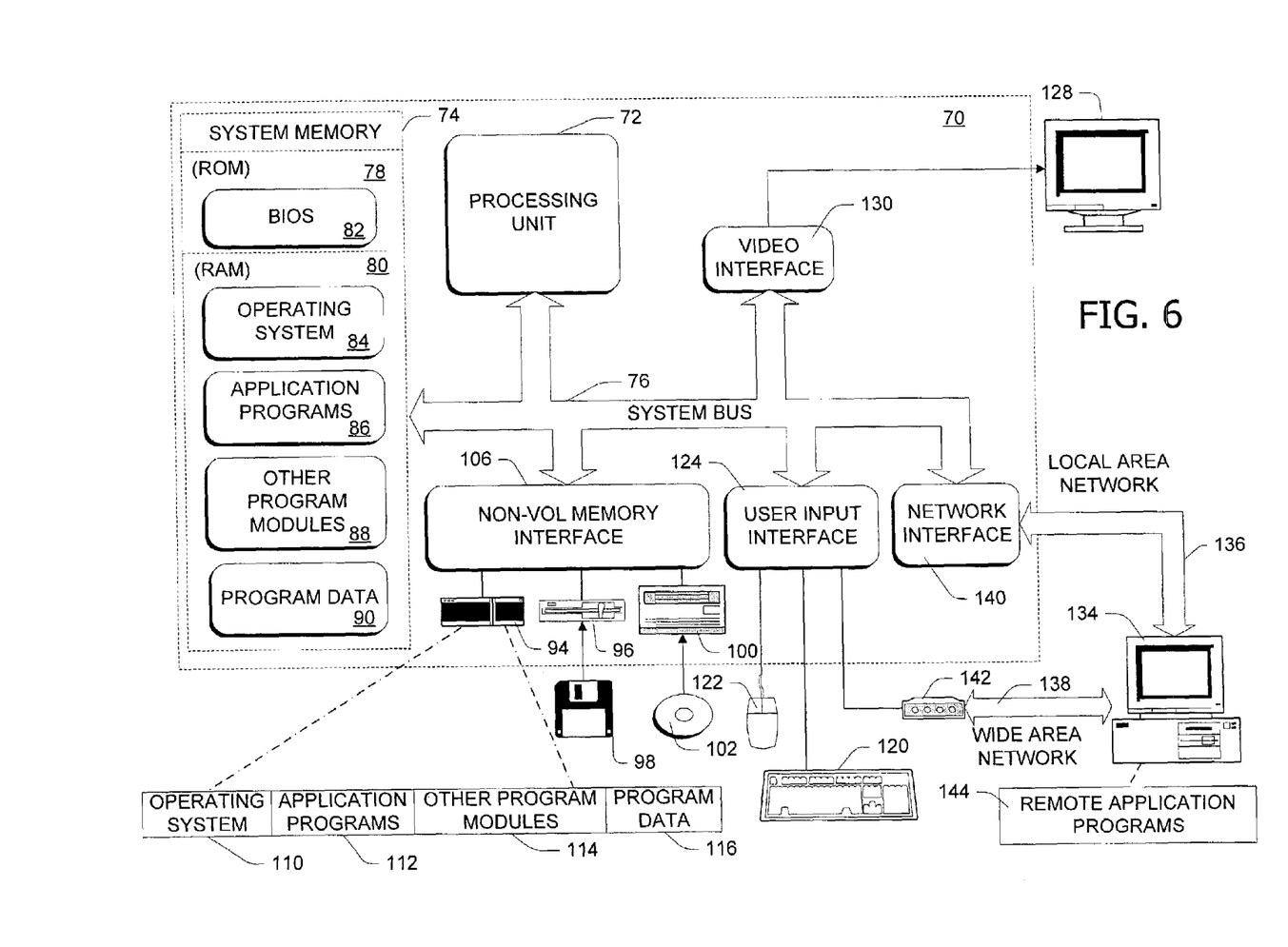
FIG. 6 is a block diagram illustrating components of a computer for use in the system of FIG. 1.

FIG. 6 shows one example of a general purpose computing device in the form of a computer 70. In one embodiment of the invention, a computer such as the computer 70 is suitable for use in client computer system 162, authentication server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 6 illustrates operating system 84, application programs 86, other program modules 88, and program data 90.

The computer 70 may also include other removable/non-removable, volatile/nonvolatile computer storage media. For example, FIG. 6 illustrates a hard disk drive 94 that reads from or writes to non-removable, nonvolatile magnetic media. FIG. 6 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 6, provide storage of computer readable instructions, data structures, program modules and other data for the computer 70. In FIG. 6, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 6 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 6 illustrates remote application programs 144 as residing on the memory device.

It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including cell phones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those illustrated in the drawings to define one or more groups of services provided by network servers 166 and to store user-specific information identifying the user with respect to the services in database 172. After receiving a request from the user for a first selected service, determining whether the first selected service belongs to one of the service groups, authentication server 170 retrieves the user-specific information identifying the user with respect to the first selected service. The retrieved user-specific information includes operational information to be shared within each of the service groups to which the first selected service belongs. In response to authenticating the user, authentication server 170 generates an authentication ticket associated with the user and the first selected service. The operational information to be shared is associated with the authentication ticket. Thereafter, the user is routed, with the ticket, to the affiliate server 166 that provides the first selected service.

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

A) Abby subscribes to, for example, MSN® network premium content. Abby finds that she only has to sign in once to the service in order to be able to automatically access any of the premium content, even when she leaves the service to go to another site and then comes back during the same client session.

B) Ichiro signs in to member services for a multi-site user authentication system such as Microsoft®.NET™ Passport single sign-in service) and takes the option allowing him to look at the site/service specific information. He discovers that his e-mail extended subscription is still listed after he thought that this subscription had expired when he got his network service premium subscription. Ichiro contacts the network service premium subscription support and makes sure that his older e-mail subscription is no longer active and that he is not being billed for it. Later, when Ichiro signs in to member services for the single sign-in service, he notices that he is no longer listed as having a premium subscription to the e-mail service.

C) An affiliate site requires a valid e-mail address in order to properly function. When Ichiro signs in for the first time, the single sign-in service asks Ichiro for consent to share the e-mail address and validation information. Ichiro denies this request and the affiliate site warns him that he cannot use its site without providing this information. Ichiro is then presented with the consent page again and this time he grants consent. The affiliate site reviews the e-mail validation information and allows Ichiro to proceed with his use of the affiliate site's service.

D) Joseph has a paid subscription to, for example, MSN® network premium content. This allows him to get additional sports content, as well as access to certain on-line chats, from a related sports network (e.g., ESPN® sports network). Joseph uses the Internet service network as his portal and he typically signs in at that location. After he signs into his account, he chooses to go to "sports." Once at the related sports site, he picks the ongoing chat regarding the first game at his favorite football team's new stadium and joins in. Joseph does not need to sign in again to provide authentication that he is allowed access to the premium sports content.

What is claimed is:

1. A method of sharing information among network servers, said network servers being coupled to a data communication network for providing services to a user via a client, said client also being coupled to the data communication network, said method comprising:

registering a plurality of services provided by the network servers;

registering a user with respect to a first selected service, said registering comprising receiving, from said user, user-specific information identifying said user with respect to operational information specific to the first selected service and, in response to receiving said user-specific information, assigning said user a unique identifier;

grouping a plurality of the registered services provided by the network servers to define one or more service groups;

storing, in a central database, the user-specific information, said user-specific information including operational information to be shared within each of the service groups to which the first selected service belongs, said central database being associated with a central server coupled to the data communication network;

receiving a request from the user for a second selected service to be provided by one of the network servers, said request being received at the central server, said first and second selected services defining a first service group;

determining, in response to receiving said request, whether the second selected service is registered and belongs to one of the service groups to which the first selected service belongs;

retrieving, from the central database, the user-specific information including the operational information to be shared within each of the service groups to which the first selected service belongs when the second selected service is determined to belong to one of the service groups to which the first selected service belongs;

automatically authenticating the user with respect to the second selected service when navigating from the first selected service, which is in the first service group, to the second selected service, which is also in the first service group; and generating an authentication ticket including the retrieved user-specific information and routing the user, with the ticket including the retrieved user-specific information, to the network server providing the second selected service, wherein operational information specific to the second selected service and the operational information for sharing between the first and second selected services accompanies the ticket.

2. The method of claim 1 further comprising generating an authentication ticket including the retrieved user-specific information and routing the user, with the ticket, to the network server providing the second selected service.

3. The method of claim 2 wherein the ticket provides the operational information specific to the first selected service and the operational information for sharing between the first selected service and another service in the same service group.

4. The method of claim 2 further comprising storing, in the central database, authentication information for comparison to login information provided by the user to authenticate the user and authenticating the user before routing the user to the network server providing the second selected service.

5. The method of claim 1 further comprising sharing the retrieved user-specific information with another service in the same service group.

6. The method of claim 5 wherein sharing the retrieved user-specific information comprises sharing selected portions of the operational information with another service in the same service group as a function of active context of the first selected service.

7. The method of claim 1 further comprising storing, in the central database, user preference information with respect to at least one of the registered services, said user preference information being stored in the form of a user profile, and sharing the user profile among the services in the same service group.

8. The method of claim 1 wherein the operational information specifies a relationship between the user and the services in the service groups.

9. The method of claim 1 wherein grouping the services to define the service groups comprises pre-defining contractual relationships between at least two of the registered services.

10. The method of claim 1 further comprising receiving a request from the user for a third selected service to be provided by one of the network servers and determining whether the third selected service is registered, said request being received at the central server, said first and third selected services defining a second service group.

11. The method of claim 10 further comprising receiving a request at the central server to re-authenticate the user with respect to the third selected service when navigating from the second selected service, which is in the first service group, to the third selected service, which is in the second service group.

12. The method of claim 11 further comprising generating another authentication ticket including the retrieved user-specific information and routing the user, with the other ticket including the retrieved user-specific information, to the network server providing the third selected service.

13. The method of claim 12 wherein operational information specific to the third selected service and the operational information for sharing between the first and third selected services accompanies the other ticket.

14. The method of claim 1 further comprising encrypting or tamper proofing the operational information.

15. The method of claim 1 further comprising operating a browser program configured to permit the user to communicate on the data communication network.

16. The method of claim 1 wherein the network servers are web servers and the data communication network is the Internet.

17. The method of claim 1 wherein the central server is an authentication server of a multi-site user authentication system and the network servers are affiliated with authentication server, said authentication server receiving requests to authenticate the user when the user requests services to be provided by the affiliated network servers.

18. A method of sharing information among affiliate servers coupled to a data communication network in a multi-site authentication system, said authentication system including an authentication server coupled to the data communication network and a database associated with the authentication server, said database storing authentication information for comparison to login information provided by a user for authenticating the user, said method comprising:

registering a plurality of affiliate servers;

registering a user to be associated with one or more user-selected services provided by the registered affiliate servers, said registering comprising receiving, from said user, user-specific information identifying the user with respect to operational information specific to the one or more user-selected services and, in response to receiving said user-specific information, assigning said user a unique identifier;

storing, in the database, the user-specific information identifying the user with respect to the one or more user-selected services, said user-specific information including operational information to be shared within pre-defined groups of the registered affiliate servers, said affiliate servers providing the services to the user via a client coupled to the data communication network;

receiving a request from the user for a first selected service to be provided by one of the registered affiliate servers, said request being received at the authentication server;

generating an authentication ticket associated with the user and the first selected service, said authentication server generating the authentication ticket in response to authenticating the user, said authentication ticket having operational information associated therewith to be shared within each of the groups to which the first selected service belongs;

routing the user, with the ticket, to the registered affiliate server providing the first selected service;

retrieving, from the database, the user-specific information identifying the user with respect to the first selected service, said retrieved user-specific information including the operational information to be shared within each of the groups to which the first selected service belongs;

sharing the retrieved user-specific information with another service in the same group, wherein sharing the retrieved user-specific information comprises sharing selected portions of the operational information with another service in the same group as a function of active context of the first selected service.

19. The method of claim 18 further comprising grouping a plurality of the services provided by the registered affiliate servers to define one or more service groups.

20. The method of claim 19 further comprising determining whether the first selected service belongs to one of the service groups.

21. The method of claim 19 wherein grouping the services to define the service groups comprises pre-defining contractual relationships between at least two of the services provided by the registered affiliate servers.

22. The method of claim 18 wherein the operational information associated with the ticket contains operational information specific to the first selected service and operational information for sharing between the first selected service and another service in the same group.

23. The method of claim 18 further comprising storing, in the database, user preference information with respect to at least one of the services, said user preference information being stored in the form of a user profile, and sharing the user profile among the services in the same group.

24. The method of claim 18 wherein the operational information specifies a relationship between the user and the services in the groups.

25. The method of claim 18 further comprising receiving a request from the user for a second selected service to be provided by one of the registered affiliate servers, said request being received at the authentication server, said first and second selected services defining a first service group.

26. The method of claim 25 further comprising automatically authenticating the user with respect to the second selected service when navigating from the first selected service, which is in the first service group, to the second selected service, which is also in the first service group.

27. The method of claim 26 further comprising routing the user, with the ticket and service specific operational data, to the registered affiliate server providing the second selected service.

28. The method of claim 27 wherein the operational information associated with the ticket comprises operational information specific to the second selected service and operational information for sharing between the first and second selected services.

29. The method of claim 25 further comprising receiving a request from the user for a third selected service to be provided by one of the registered affiliate servers, said request being received at the authentication server, said first and third selected services defining a second service group.

30. The method of claim 29 further comprising receiving a request at the authentication server to re-authenticate the user with respect to the third selected service when navigating from the second selected service, which is in the first service group, to the third selected service, which is in the second service group.

31. The method of claim 30 further comprising generating another authentication ticket having operational information to be shared within the second service group associated therewith and routing the user, with the other ticket, to the registered affiliate server providing the third selected service.

32. The method of claim 31 wherein the operational information associated with the other ticket comprises operational information specific to the third selected service and operational information for sharing between the first and third selected services.

33. The method of claim 18 further comprising encrypting or tamper proofing the operational information.

34. The method of claim 18 further comprising operating a browser program configured to permit the user to communicate on the data communication network.

35. The method of claim 18 further comprising permitting the registered affiliate servers to perform one or more of the following operations directly on the operational information stored in the authentication database without the user being present: query, add, modify, and delete.

36. The method of claim 18 further comprising retaining authority, by the authentication server, to control storing and sharing operational information according to a pre-defined use policy.

* * * * *